Sept. 9, 1969  V. L. ROGALLO  3,465,747
BALLISTOCARDIOGRAPH
Filed Nov. 17, 1964  4 Sheets-Sheet 1

INVENTOR.
VERNON L. ROGALLO
BY
ATTORNEYS

Sept. 9, 1969          V. L. ROGALLO          3,465,747

BALLISTOCARDIOGRAPH

Filed Nov. 17, 1964          4 Sheets-Sheet 2

INVENTOR.
VERNON L. ROGALLO
BY
ATTORNEYS

Sept. 9, 1969     V. L. ROGALLO     3,465,747
BALLISTOCARDIOGRAPH
Filed Nov. 17, 1964     4 Sheets-Sheet 4
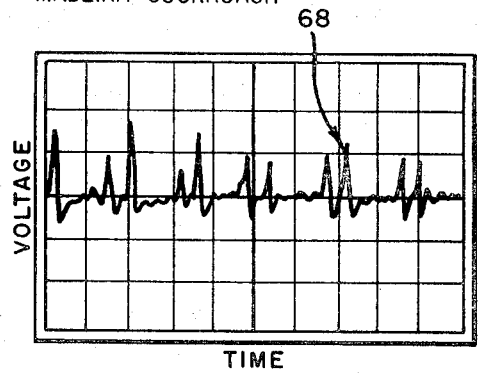
FIG-7 — Vibration trace of Madeira cockroach
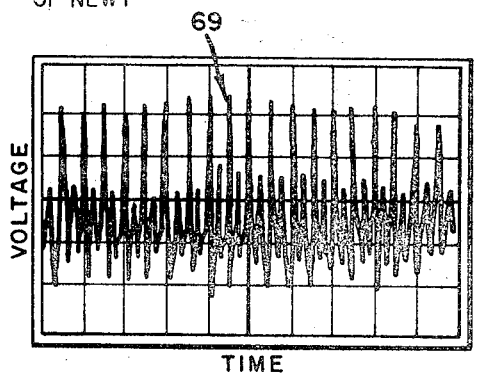
FIG-8 — Vibration trace of newt
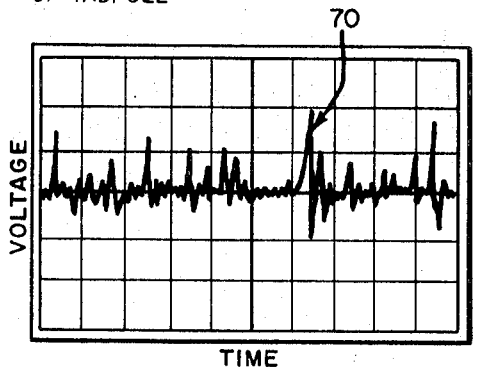
FIG-9 — Vibration trace of tadpole
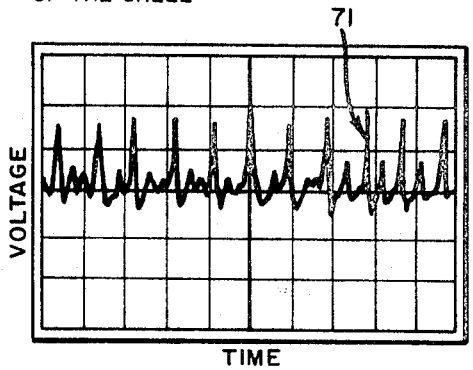
FIG-10 — Vibration trace of a chicken six days after hatching out of the shell
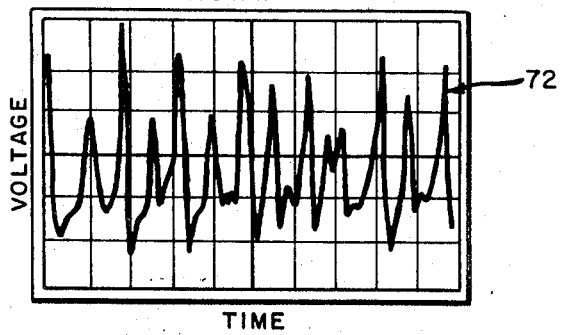
FIG-11 — Vibration trace of twelve-day old rat
INVENTOR.
VERNON L. ROGALLO
BY
ATTORNEYS United States Patent Office 3,465,747
Patented Sept. 9, 1969

3,465,747
BALLISTOCARDIOGRAPH
Vernon L. Rogallo, 539 Los Ninos Way,
Los Altos, Calif. 94022
Filed Nov. 17, 1964, Ser. No. 411,943
Int. Cl. A61b 5/02, 5/04
U.S. Cl. 128—2.05     12 Claims

ABSTRACT OF THE DISCLOSURE

An ultrasensitive transducer capable of measuring the heartbeat of research biological organisms. The transducer comprises a pair of cantilever supported piezoelectric beams to the free ends of which is attached a support stem. The support stem carries a container in which the test organism is placed. For example, in testing an avian embryo the support stem carries a basket in which an egg may be placed. The force reaction of a heartbeat or other muscular movement in the test organism causes the piezoelectric beams to deflect and therefore generate an electrical voltage output. The frequency of this output is exactly the same as the frequency of the heartbeat or other motion, and the amplitude of the output is a measure of the strength of the heartbeat or other motion. Suitable electronic circuitry is provided to amplify and filter the piezoelectric output and put it in a form suitable for visual or audio study and recording.

---

The invention described herein may be manufactured and used by or for the Government of the United States of America for governmental purposes without the payment of any royalties thereon or therefor.

This invention relates to a method and apparatus for use in biological research and particularly in biomedical research. More specifically the invention relates to a method and apparatus for detecting and measuring mass movement within a biological organism without physically entering the organism. A specific example of considerable importance relates to the measurement of the heartbeat of avian embryos.

The need for providing an improved method of testing the many new medical and food products which are being developed in such volume is believed to be obvious. It is not a simple matter to determine whether a new product will have a beneficial or harmful effect on humans. Many unfortunate experiences have in recent years been suffered with chemicals that have teratogenic effects in humans. It is simply a matter that conventional testing methods have failed to detect the damaging effects. Thus, it is clear that additional and new techniques must be provided.

In the field of biomedical research it is known that growing tissue such as is found in chick embryos is a particularly suitable vehicle to determine the effects of new products such as vaccines and various drugs. Among the very desirable features of a testing technique involving avian embryos are the relatively short incubation period for an avian embryo as compared to animals on which most tests are usually conducted. It requires only three weeks to hatch a chicken, for example. The cost of the test vehicle or egg is relatively low, and space requirements are also small. Perhaps the most important feature is the possibility that the harmful effect of certain substances on humans will be revealed by their reaction on avian embryos whereas prior testing techniques would not reveal the harmful nature of the substances.

It is a simple matter to inject into the shell of an egg the type of material to be tested, but it is extremely difficult to determine with accuracy the effect which is taking place. One prior attempted technique was to determine heartbeat or muscular movement by inserting probes into appropriate areas for electrocardiograph measurements. This technique has not been a solution because of the difficulty of inserting the probes, the damage to tissues which is caused by the probes themselves, and the unnatural effects caused by the mere presence of the probes.

Another technique has been the visual or candling approach. This technique has a very poor degree of sensitivity and at best is only capable of detecting major changes. In many cases it has been found necessary to destroy the embryo by removing the shell in order to determine what effect a drug or vaccine is having. There simply has not been a completely suitable technique for detecting and monitoring the effect of vaccines and drugs on avian embryos throughout the incubation period. In particular there has not been a satisfactory method of detecting and measuring the heartbeat of avian embryos.

Accordingly, an object of the invention is to provide a satisfactory method and apparatus for detecting and measuring the heartbeat of avian embryos during the incubation period.

More specifically, an object of the invention is to provide a method and apparatus for detecting and measuring the heartbeat of an avian embryo in a manner which will not of itself have any affect on the heartbeat.

Another object of the invention is to provide a method and apparatus for detecting and measuring the heartbeat on an avian embryo while the egg is allowed to remain in an incubator.

An additional object of the invention is to provide a method and apparatus for providing measurement over a continuous period of the heartbeat of an avian embryo.

More specifically, an object of the invention is to provide a method and apparatus for detecting and measuring the heartbeat of an avian embryo by detecting and measuring the action of the heartbeat from the outside of the shell.

Since the embryo supplies the pulses to which external ballistocardiograph apparatus must respond, it is of interest to consider briefly some of the characteristics of heart growth and action as well as other movement of the embryo during incubation. At 26 hours of incubation a primitive heart has developed in the form of a single tube which pulses sporatically at intervals in the order of minutes. During the next two or three days the heart invaginates and by the fifth day it becomes a four-chamber heart resembling that in humans. With respect to measurement of heart actions with apparatus which must detect the force of the heartbeat it is interesting to note that in a four-day old chicken embryo the heart weighs only .00071 gram. The entire embryo weighs .1 gram, and the whole egg weighs 49.7 grams. It is the action of this tiny organ producing minute momentum changes that the ballistocardiograph must sense through its effect on a sensing unit supporting the egg.

The difficulty in detecting and measuring the heartbeat of avian embryos from outside the shell is caused partly by the small magnitude of the force of the heartbeat and partly by the fact that nature has provided the embryo with an excellent force-isolating protective structure. Within the rigid outer container or shell the embryo is protected by being encased in a flexible membrane which at one end is spaced from the shell to provide an air cell. Thus, a heartbeat or muscular movement displacement is not strongly transmitted to the shell but tends to be accommodated by distortion of the membrance. Thus, it has not heretofore been considered that the heartbeat of an avian embryo could be detected from the outside of the egg in a manner which would give useful data for determining the effect of substances injected through the shell.

Similarly, there are endless other living organisms which may be beneficially employed in biological and biomedical research but have not been heretofore utilized because of difficulty of monitoring heartbeat or any other type of motion or vibration which would be informative of the condition of the organism. Prior to the present invention there has been no way of monitoring heartbeat or other informative motion or vibration without the use of probes or other apparatus attached to the creature being tested. In addition, many tests made possible by the present invention were not heretofore possible even with the use of probes or other types of apparatus attached to the organism being tested. For example, periodic activity within the following organisms has been monitored by the invention with excellent results. The weight of the organism or other pertinent data in each example is stated parenthetically as follows: Madeira cockroach (2 grams); chicken (immediately after hatching and up to six day old specimen); newt (5.2 grams) tadpole in water (4.8 grams); and rat (age 12 days).

Thus, a general object of the invention is to provide a method and apparatus for monitoring motion or vibration within a variety of living organisms without contamination or introduction of foreign environment.

A significant feature is that the organisms are not rigidly restrained but are free to move about in a container. Accordingly, another object of the invention is to provide a method and apparatus for monitoring motion or vibration within living organisms while the organisms are free to move about in normal fashion.

By way of brief description the objects of the invention are accomplished by means of an ultrasensitive momentum transducer. More specifically, the transducer comprises a pair of cantilever supported piezoelectric beams to the free ends of which is attached a support stem. The support stem carries a container in which the test organism is placed. For example, in testing an avian embryo the support stem carries a basket in which an egg may be placed. The force reaction of a heartbeat or other muscular movement in the test organism causes the piezoelectric beams to deflect and therefore generate an electrical voltage output. The frequency of this output is exactly the same as the frequency of the heartbeat or other motion, and the amplitude of the output is a measure of the strength of the heartbeat or other motion. Suitable electronic circuitry is provided to amplify and filter the piezoelectric output and put it in a form suitable for visual or audio study and recording. As will be described in detail hereinafter, dramatic results are achieved which provide heretofore unavailable information.

Other and further objects and features of advantage will be apparent to those skilled in the art from the following detailed description wherein reference is made to the accompanying drawings in which.

Figure 4:
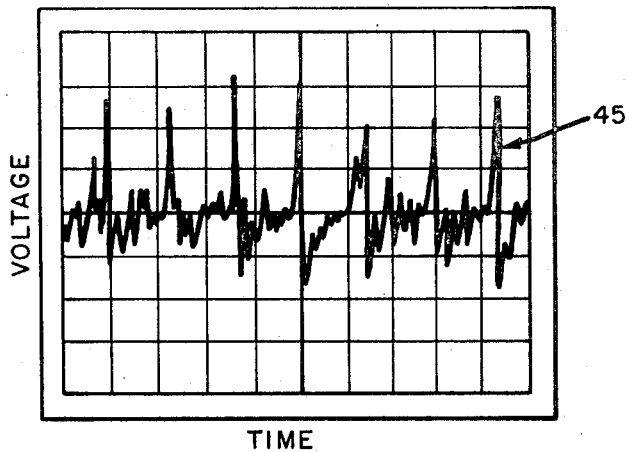
FIGURE 4 is an enlarged view of the oscilloscope screen showing the heartbeat trace thereon of a four-day old chicken egg under normal conditions. For purposes of comparison the amplification figure in FIG. 4 is 50,000.

FIGURES 5A–5C disclose an oscilloscope screen showing the heartbeat trace thereon of a sixteen-day old chicken egg depicting the effects of adrenalin. FIG. 5A shows the trace before injection; FIG. 5B shows the trace 3 seconds after injection and FIG. 5C shows the trace 11 seconds after injection. FIGS. 5A and 5B are at 5,000 amplification and FIG. 5C is at 2,500 amplification;

FIGURES 6A–6C are similar to FIGS. 5A–5C but depict the effects of alcohol on a nineteen-day old chicken egg. FIG. 6A shows the trace before the injection of alcohol; FIG. 6B shows the trace 2 seconds after injection; and FIG. 6C shows the trace 15 hours and 47 seconds after injection. FIGS. 6A–6C are all at 500 amplification;

FIGURE 7 is a view similar to FIG. 4 but showing the vibration trace of a Madeira cockroach under normal conditions at 250 amplification;

FIGURE 8 is a view similar to FIG. 7 but showing the vibration trace of a newt under normal conditions at 250 amplification;

FIGURE 9 is a view similar to FIG. 7 but showing the vibration trace of a tadpole under normal conditions at 25,000 amplification.

FIGURE 10 is a view similar to FIG. 7 but showing the vibration trace of a six day old chicken under normal conditions at 100 amplification; and FIGURE 11 is a view similar to FIG. 7 but showing the vibration trace of a twelve day old rat at 250 amplification.

Figure 1:
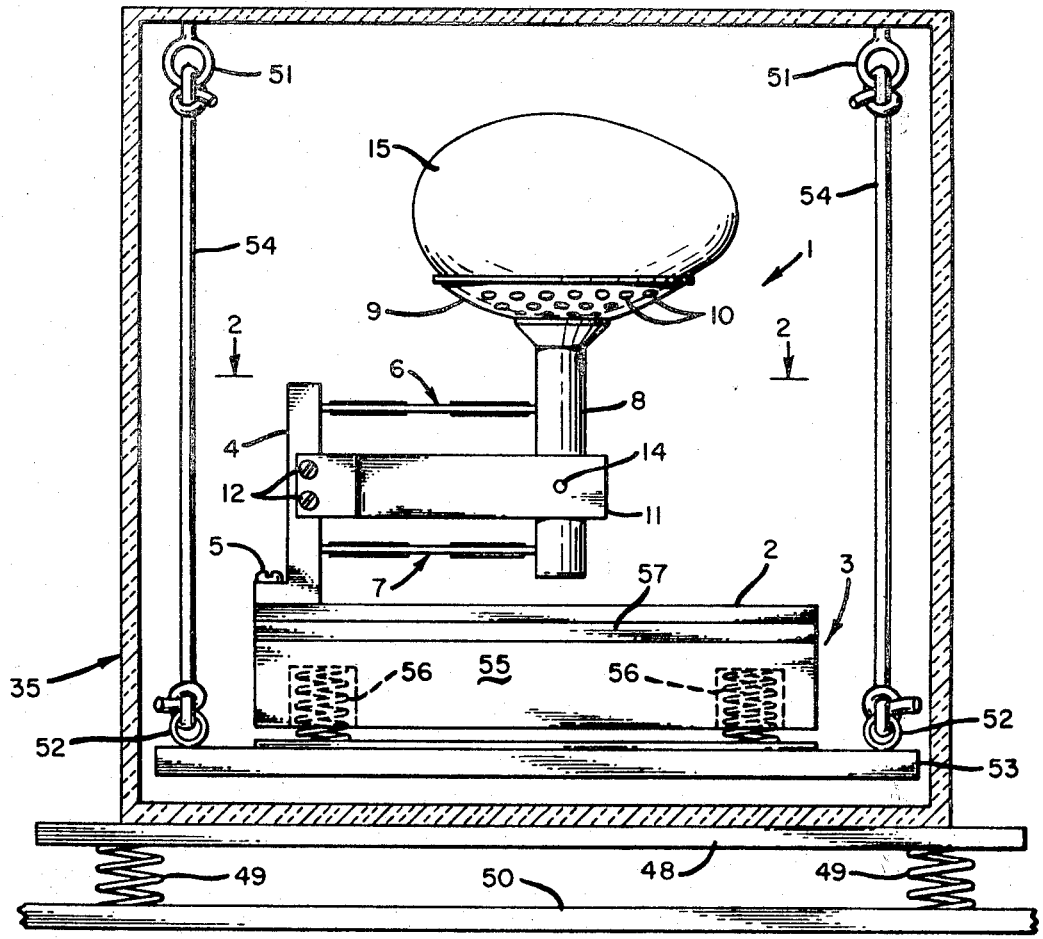
FIGURE 1 is a side elevational view of a transducer supporting an egg and positioned in an incubator.
Figure 2:
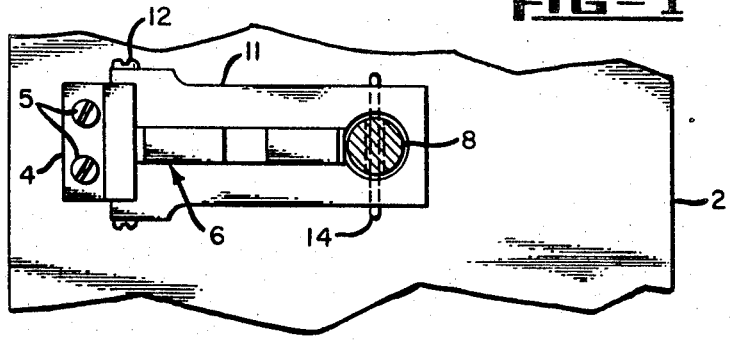
FIGURE 2 is a top view of the transducer taken on the line 2—2 of FIGURE 1.

Referring in more detail to the drawings, FIG. 1 shows a transducer 1 comprising a base plate 2 mounted on a damping support system 3 which will be hereinafter described in detail. The transducer has a support post 4 which is rigidly mounted on the base plate and is held in place by bolts 5. A pair of piezoelectric beams 6 and 7 are bonded at one end to the post 4 and at their other ends to a support rod 8. The support rod 8 carries a container in which the test organism is placed. For example, in testing an avian embryo the support rod carries a plastic basket 9 preferably provided with lightening holes 10. In order to make the transducer more rugged, a brace member 11 is attached to the support post 4 by means of screws 12. An oversized vertical bore is drilled in member 11 to receive the support rod 8 for vertical oscillating motion therein. A protective stop arrangement is achieved by drilling a cross passage through member 11 and through the support rod 8 and inserting a pin 14 therethrough. The portion of the cross passage in member 11 has a snug fit with pin 14 whereas the cross passage through support rod 8 is oversized by the amount necessary to accommodate the anticipated oscillation to be caused by the heartbeat of an egg 15 positioned in basket 9. Thus, a spring mass system is provided in which an egg in basket 9 will, by virtue of the heartbeat of the embryo therein, cause vertical oscillation of the basket and the support rod 8. Such oscillation will cause the piezoelectric beams to flex, and as is well known in the art such flexure will generate an electrical voltage output.

Figure 3:
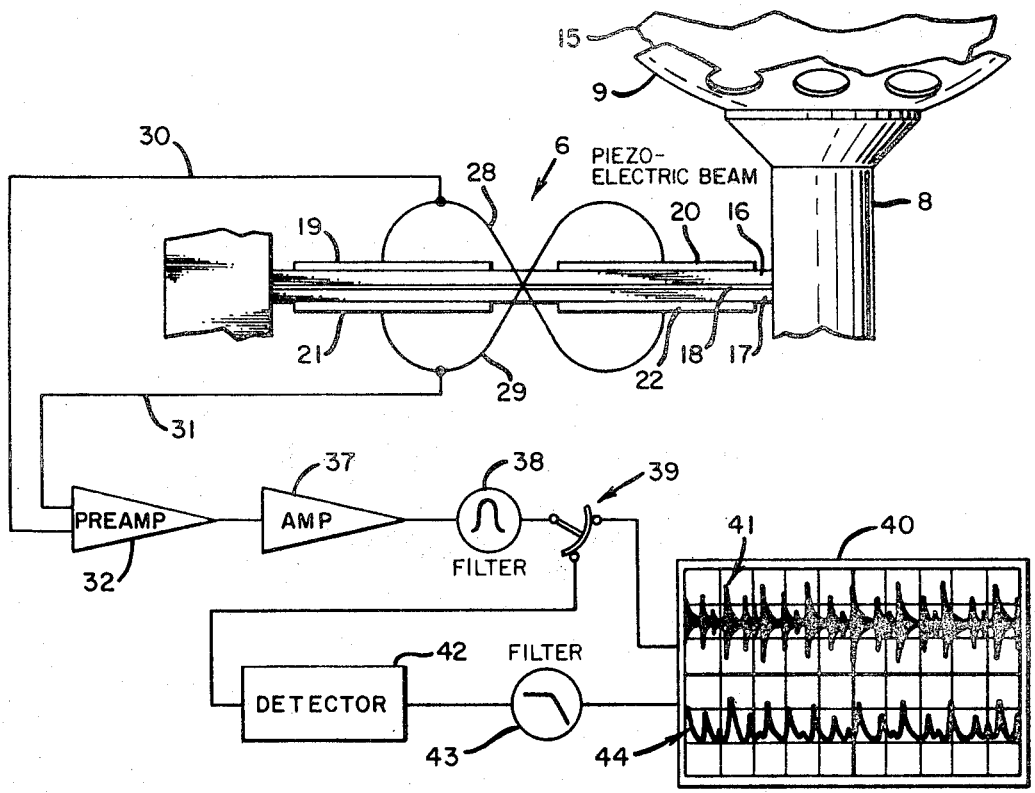
FIGURE 3 is an enlarged elevational view of one of the piezoelectric beams of the transducer and showing an appropriate electrical circuit diagram, including an oscilloscope screen.

The beams 6 and 7 are preferably identical and a particularly suitable type of beam is shown enlarged in FIG. 3. A preferred type of beam is a conventional piezoelectric BIMORPH construction comprising upper and lower crystal ceramic strips 16 and 17 separated by a central metal electrode strip 18. For example, the "PZT-BI-MORPH" beam made by Clevite Electronic Components Division of Clevite Corporation can be used. Any ferroelectric material which exhibits piezoelectric effects in bending can be employed. As used throughout the specification and claims the term piezoelectric beam means a beam which has the property of generating electrical charge under the influence of mechanical bending forces and the property of producing mechanical bending forces under the influence of electrical voltage. Separate metal electrodes 19 and 20 are coated on the upper surface of the upper strip 16, and separate metal electrode strips 21 and 22 are coated on the bottom surface of the bottom strip 17.

Lead wires, which are too small to be visible in the scale of FIG. 1, are connected to the electrodes 19–22 for both of the beams. One suitable wiring arrangement is shown in FIG. 3 for one of the beams. More specifically, electrodes 19 and 22 are connected together via wire 28 and electrodes 20 and 21 are connected together by a wire 29. Wires 28 and 29 can then be connected by leads 30 and 31 to a conventional differential preamplifier 32. Electrodes 19–22 can obviously be connected to the amplifier in different ways than shown in FIG. 3. The arrangement shown in FIG. 3 is selected to provide a large compacitance into the amplifier. Although the output of both of the beams 6 and 7 can be connected to the amplifier in different ways than shown in FIG. 3. tained using the output of only one of the beams.

As shown in FIG. 1 the preferred arrangement is to position the transducer 1 in a conventional incubator 35 with an egg 15 cradled in the basket 9. The leads 30 and 31 are then taken out of the incubator to a conventional amplifier 32.

The preamplifier 32 is a differential unit with common mode rejection. The purpose of the preamplifier is to provide moderate voltage gain plus a low impedance output. The latter is to enable light unshielded leads to be used and still minimize unwanted electrical noise. Following the preamplifier 32, the signal is taken to a conventional wide band amplifier 37 and then preferably through a filter 38. The filter is a narrow-band-pass type filter with cutoffs set, for example, 50 cycles above and below the transducer frequency. The signal is then ready to be taken through a three-position switch 39 directly to an oscilloscope 40 to give an undetected trace 41, and simultaneously through a conventional detector 42 and low pass filter 43 to give a detected trace 44. Alternatively the switch 39 can be set to provide either the undetected or detected trace separately. The traces shown in FIGS. 4–11 are detected traces.

Operation of the previously described apparatus is simply a matter of placing an egg 15 in the basket 9 and observing the trace of the heartbeat on the oscilloscope 40. The force on the sensing beam 6 due to the weight of the egg is, of course, a constant and causes only a static deflection of the beam. However, cardiovascular forces within the egg are transmitted to the basket 9 to cause dynamic deflection of the sensing beam 6. The magnitude of the deflection of beam 6 and hence its electrical output is proportional to the magnitude of the heartbeat. Thus, the amplitude of the trace on the oscilloscope screen represents the magnitude of the heartbeat. The frequency of the peaks on the oscilloscope trace of course corresponds to the pulse rate. By way of specific example, FIG. 4 represents a picture taken of the oscilloscope trace 45 for a four-day old chicken embryo having a pulse rate of 205 beats per minute. As an indication of why ballistocardiograph testing of egg embryos was not previously a research procedure, it is pointed out that the weight of the heart of a normal four-day old chicken embryo is about .00071 gram and the weight of the entire egg is about 50 grams. It is simply a matter that it is almost impossible to conceive of such a small mass as the .00071 gram heart accelerating the 50 gram egg to a measurable extent.

In order to measure such minute forces, the transducer 1 must of course be extremely sensitive. As a result, the transducer must be carefully shielded from extraneous vibratory forces. One suitable shielding arrangement is the damping support system 3 shown in FIG. 1. In support system 3 the incubator 35 is supported on a plywood piece 48 mounted on four springs 49 attached to a second piece of plywood 50, which is in turn placed on any conventional supporting surface such as a table top. The transducer is actually hung from the ceiling of the incubator by means of four eye bolts 51 on the ceiling of the incubator and four eye bolts 52 on an aluminum platform 53. Gum rubber tubing 54 is tied between the upper and lower eye bolts at each of the four corners of the platform 53. A heavy lead damping mass 55 is supported on platform 53 by means of four springs 56 recessed in the bottom of base 55 adjacent each of its four corners. A foam rubber pad 57 is placed on the mass 55, and the base plate 2 of the transducer rests directly on the rubber pad. By was of specific example, the springs represented diagrammatically at 49 and 56 can be the "plate form mountings," 150 series and 100 series respectively, manufactured by the Lord Manufacturing Company.

The test procedure for avian embryos is simply to place an uninjected egg 15 on the transducer 1 and record the heartbeat for example as shown in FIG. 4, for later comparison with the heartbeat recorded under some different condition. Such different condition can be simply the passage of time so that the development of the heart can be studied throughout the growth of the embryo. Also, the egg can be subjected to external stimuli, such as change of environmental factors like temperature and light.

Figure 6:
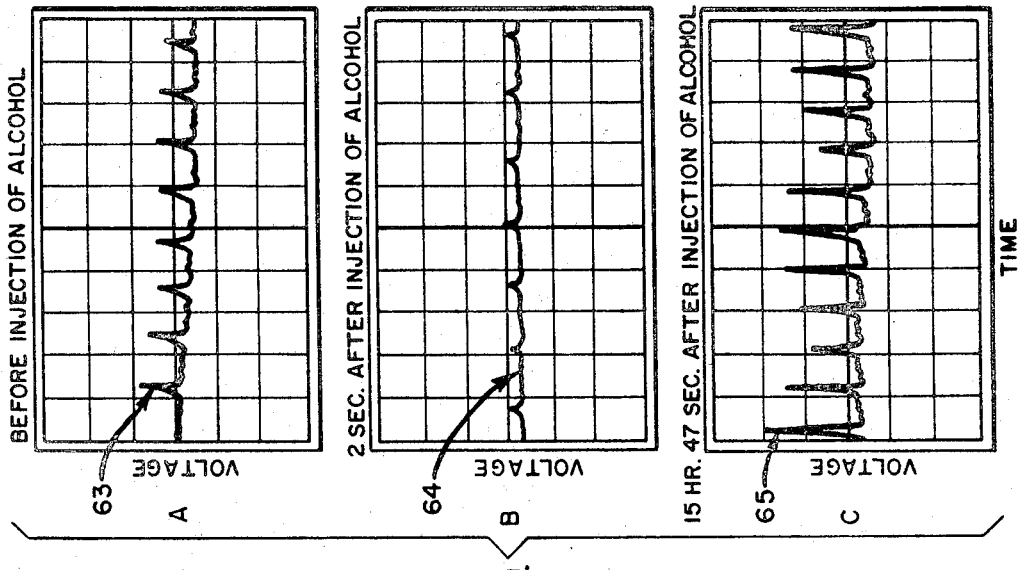
Figure 5:
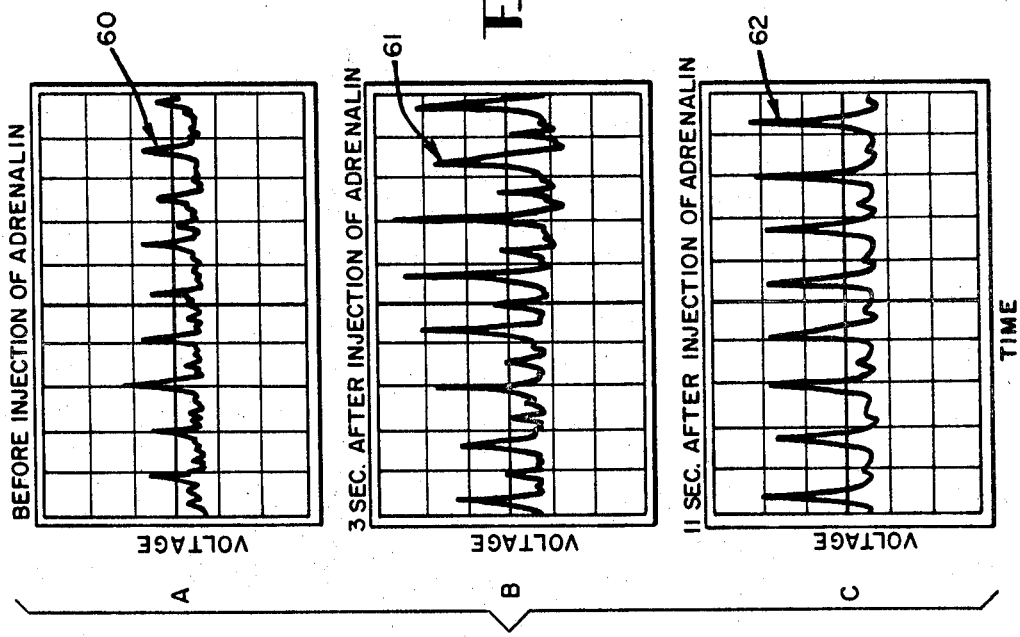

One of the most useful test procedures for avian embryos is to place an egg 15 on the basket 9 for the transducer 1; record the normal heartbeat of the egg; remove the egg from the basket 9 for the transducer and inject a test substance through the egg shell into the air cell at the end of the egg; replace the egg on the basket 9 for the transducer; and then record the heartbeat traces at subsequent intervals for comparison with each other and with the heartbeat prior to injection. Exemplary results of this procedure are depicted in FIGS. 5 and 6, which show tests of adrenalin and alcohol, respectively. More specifically, to test the effects of adrenalin, an egg is placed on the basket 9 for the transducer prior to being injected with adrenalin and a reference heartbeat trace 60 is recorded as shown in FIG. 5A. Then the heartbeat is recorded at selected intervals to determine what effects, if any, the test substance has on the embryo. In the case of adrenalin, the heartbeat is greatly strengthened almost immediately, as shown by the trace 61 in FIG. 5B, representing the heartbeat 3 seconds after injection. The effects of the adrenalin continue to increase fairly rapidly, and the amplitude of the trace is about 4 times greater than prior to the injection after 11 seconds as shown by the trace 62 in FIG. 5C. It should be recalled that the trace in FIG. 5C is at half the amplification of FIGS. 5A and 5B. The egg actually used in the tests shown in FIG. 5 was a 16 day old chicken egg. The amount of adrenalin injected into the air cell was .02 milliliter. The pulse rate prior to injection was 262 beats per minute. At 3 seconds after injection the pulse rate was 220 beats per minute and at 11 seconds after injection it was 234 beats per minute. Obviously, the heartbeat trace can be recorded continuously by use of an oscillograph, tape recorder, or other similar device instead of or in addition to the still picture technique.

In the case of alcohol, the egg employed in the test was a 19 day old chicken egg. FIG. 6A shows the reference heartbeat trace 63 which was recorded prior to injection of alcohol. The depressing effect of the alcohol is clearly apparent after only 2 seconds as shown by the trace 64 in FIG. 6B in which the amplitude of the heartbeat is greatly reduced. The pulse rate for FIG. 6A is 247 beats per minute and the very much depressed rate for FIG. 6B is 203 beats per minute. After about 15 hours, the egg is suffering the after-effects in the form of an unusually rapid pulse rate of 307 beats per minute and an abnormally heavy heartbeat, varying in intensity as shown by the trace 65 in FIG. 6C. The amount of alcohol injected into the air call was .05 milliliter.

Thus, it will be noted from FIGS. 5 and 6 that research methods and apparatus described herein provide a very beneficial new tool for determining the effects of new substances in a fast, inexpensive and reliable manner. For example, if adrenalin and alcohol were new substances being proposed for use by humans, the tests represented by FIGS. 5 and 6 would clearly predict the type of reactions which are now, of course, well known to be the actual human reactions to adrenalin and alcohol.

The apparatus and methods of the invention can be used with a wide variety of biological organisms other than avian embryos. FIGURES 7–11, for example, represent actual traces of the vibratory motion of a variety of biological organisms monitored in accordance with the invention prior to any injection. More specifically, FIG. 7 shows the vibration trace 68 of a Madeira cockroach weighing 2 grams. FIG. 8 shows the vibration trace 69 of a newt weighing 5.2 grams. FIG. 9 shows the vibration trace 70 of a tadpole weighing 4.8 grams. FIG. 10 shows the vibration trace 71 of a 42 gram chicken six days after it hatched out of the shell, and FIG. 11 shows the vibration trace 72 of a twelve day old rat. In each case the organism in FIGS. 7–11 was placed in a plastic cup-shaped container having solid walls. Such cup-shaped container is simply attached to the support rod 8 in place of the apertured egg-containing basket 9. In the case of the tadpole the cup-shaped container was filled with water. For purposes of comparison it is noted that the sweep rate for the traces shown in FIGS. 4, 5, 6 and 10 is 0.2 second per centimeter; the sweep rate for FIGS. 7, 8 and 9 is 0.5 second per centimeter; and the sweep rate for FIG. 11 is 0.1 second per centimeter.

As is customary with sensitive measuring equipment, it is desirable to calibrate and check the apparatus periodically to make certain that it is functioning properly. Such a check is a simple matter because of the double beams 6 and 7. More specifically, if a voltage pulse is fed into the lower beam 7, it will cause beam 7 to bend and through the interconnection of support rod 8 will cause beam 6 to bend. The bending of beam 6 will cause an output trace which will be representative of the known amplitude and frequency of the input pulse. In order to check and calibrate the apparatus it is simply a matter of comparing the output trace from the test pulses with a standard output trace previously obtained for the same amplitude and frequency of input pulses.

Although specific details of the present invention are shown and described herein, it is to be understood that modifications may be made therein without departing from the spirit and scope of the invention as set forth in the appended claims.

Having thus described the invention, what is claimed as new and desired to be secured by Letters Patent is:

1. A method of biomedical research comprising the steps of, supporting a shell with an avian embryo therein for movement, measuring the heartbeat of the avian embryo by measurement of the force of the heartbeat transmitted to the outside of the shell around the embryo through sensing the motion of said shell while said shell is supported for movement, and indicating the measurement of the force of the heartbeat.

2. A transducer for measuring movement in a biological organism comprising a support, two piezoelectric beams removed from each other, spaced one above the other and each having one end thereof connected to said support and having the other end thereof projecting from said support, a rod attached to the other end of said beams to be wholly supported thereby for movement, a container for holding a biological organism attached to said rod for imparting movement thereto in response to the motion of the biological organism along the axis defined by said rod, said piezoelectric beams being arranged to transmit a signal in response to the movement of said rod.

3. A method of biomedical research comprising the steps of injecting a test substance through the shell of an egg with an embryo therein, placing said egg in an incubator, supporting said egg for movement, measuring the heartbeat of the embryo from outside said shell through sensing the motion of the egg while the egg is supported for movement, and recording the measurement of the movement of said egg while said egg is in the incubator.

4. A method of biomedical research comprising the steps of injecting a test substance through the shell of an egg with an embryo therein, supporting said egg for movement, measuring the heartbeat of the embryo by measurement of the force of the heartbeat transmitted to the outside of the shell through sensing the motion of the egg while the egg is supported for movement, and recording the measurement of the force of the heartbeat.

5. A method of biomedical research comprising the steps of injecting a test substance through the shell of an egg with an embryo therein, supporting said egg for movement, sensing the movement of said egg and producing an electrical output representative of the heartbeat of said egg, and converting said electrical output to intelligible form.

6. Apparatus for measuring the heartbeat of an avian embryo comprising an egg receptacle, a support, and deformable means connecting said egg receptacle to said support for movement and total support thereof and for generating an electrical signal upon deformation, said deformable means being deformable by the force of the heartbeat of an embryo in said receptacle.

7. Apparatus for measuring movement in a biological organism comprising a support, two piezoelectric beams removed from each other, spaced apart parallel to each other and each having one end connected to said support and having another end projecting from said support, a rod attached to and wholly supported by the other ends of said beams, means for holding a biological organism on said rod and for imparting movement thereto in response to the motion of the biological organism along the axis defined by said rod, said piezoelectric beams being arranged to transmit a signal in response to the movement of said rod, amplifying means electrically connected to one of said beams for receiving said signal, and an oscilloscope connected to the output of said amplifying means.

8. Apparatus for measuring movement in a biological organism comprising a support fixedly attached to a base, two piezoelectric beams removed from each other, spaced apart parallel to each other and each having one end connected to said support and another end projecting from said support, a rod attached to and wholly supported by the other ends of said beams, means for holding a biological organism on said rod, one of said piezoelectric beams having electrodes at which a signal is generated in response to the motion of said biological organism along the axis defined by said rod, amplifying means electrically connected to said electrodes for receiving said signal, and vibration damping means for supporting said base.

9. Apparatus as claimed in claim 8 in which said vibration damping means comprises hanging rubber strips, a platform suspended by said strips, spring means on said platform, a lead damping mass on said spring means, and a rubber pad on said damping mass, said base of the measuring apparatus being supported on said rubber pad.

10. A method of avian embryo toxicity research comprising the steps of placing a test substance through the shell of an egg with an avian embryo therein, yieldably supporting said egg for movement resulting from the heartbeat of said embryo, and transforming said movement into an electrical signal proportional to the heartbeat of said embryo.

11. A method of avian embryo toxicity research comprising the steps of yieldably supporting an egg with an avian embryo therein for movement resulting from the heartbeat of said embryo, transforming said movement into an electrical signal representative of said movement and said heartbeat, placing a test substance within said egg, again yieldably supporting the egg for movement and transforming said movement into an electrical signal representative of said movement and said heartbeat, and comparing said signals.

12. Apparatus for measuring movement in a biological organism comprising receptacle means for supporting a biological organism, piezoelectric means connected to said receptacle means for yieldably and wholly supporting said receptacle means for movement of said receptacle means, and means connected to said piezoelectric means for converting said signal to intelligible form.

References Cited

UNITED STATES PATENTS

| 2,313,129 | 3/1943 | Dohan | 128—2 |
| 2,707,354 | 2/1955 | Chorpening | 128—2 |
| 3,076,452 | 2/1963 | Rothe | 128—2 |
| 3,090,226 | 5/1963 | Corti et al. | 128—2 |
| 3,176,681 | 4/1965 | Smith | 128—2 |

RICHARD A. GAUDET, Primary Examiner

KYLE L. HOWELL, Assistant Examiner